(12) United States Patent
Yue et al.

(10) Patent No.: US 12,120,979 B2
(45) Date of Patent: Oct. 22, 2024

(54) FULL-HYDRAULIC CHAIN REVERSING AND REMOTE CONTROL WATER-POWER HARVESTING EQUIPMENT FOR LOTUS ROOTS

(71) Applicant: Shandong Institute of Petroleum and Chemical Technology, Shandong (CN)

(72) Inventors: Jixiang Yue, Shandong (CN); Yancong Liu, Shandong (CN); Yangli Zhou, Shandong (CN); Ming Cheng, Shandong (CN); Shengqun Jiang, Shandong (CN); Xiaoli Yin, Shandong (CN); Yan Feng, Shandong (CN)

(73) Assignee: Shandong Institute of Petroleum and Chemical Technology, Shandong (CN)

( * ) Notice: Subject to any disclaimer, the term of this patent is extended or adjusted under 35 U.S.C. 154(b) by 650 days.

(21) Appl. No.: 17/602,921

(22) PCT Filed: Oct. 9, 2020

(86) PCT No.: PCT/CN2020/119904
§ 371 (c)(1),
(2) Date: Oct. 11, 2021

(87) PCT Pub. No.: WO2022/073174
PCT Pub. Date: Apr. 14, 2022

(65) Prior Publication Data
US 2023/0134283 A1    May 4, 2023

(51) Int. Cl.
*A01D 44/00*    (2006.01)
*A01D 31/00*    (2006.01)

(52) U.S. Cl.
CPC ............. *A01D 44/00* (2013.01); *A01D 31/00* (2013.01)

(58) Field of Classification Search
CPC ................................ A01D 31/00; A01D 44/00
See application file for complete search history.

(56) References Cited

U.S. PATENT DOCUMENTS 3,295,231 A * 1/1967 Talbott ................... A01D 44/00
56/8
3,540,194 A * 11/1970 Chaplin ................. A01D 44/00
299/9

FOREIGN PATENT DOCUMENTS

CN    202958198 U *  6/2013
CN    202998793 U     6/2013
(Continued)

OTHER PUBLICATIONS

PCT International Search Report for corresponding PCT Application No. PCT/CN2020/119904, 5 pages.

*Primary Examiner* — Adam J Behrens
*Assistant Examiner* — Madeline I Runco
(74) *Attorney, Agent, or Firm* — Dority & Manning, P.A.

(57) ABSTRACT

A full-hydraulic chain reversing and remote control water-power harvesting equipment for lotus roots includes a main framework, a traveling module, an elevating module, and a working module. The main framework is of a two-cross-beam structure; the working module is of a skid-mounted structure; the working module is in transmission connection with the traveling module through the elevating module and is fixedly mounted on a top surface of the main framework; the traveling module includes caterpillar bands and a two-hydraulic-motor group; the two-hydraulic-motor group is in transmission connection with the caterpillar bands; the caterpillar bands and the two-hydraulic-motor group are fixedly mounted on a bottom cross beam of the main framework; and the working module includes a power driving module, a jet working module, a water suction pipeline module and a hydraulic power module.

10 Claims, 9 Drawing Sheets

(56) References Cited

FOREIGN PATENT DOCUMENTS

| CN | 203597075 U | | 5/2014 | |
|---|---|---|---|---|
| CN | 105917838 A | | 9/2016 | |
| CN | 205551023 U | | 9/2016 | |
| CN | 107646288 A | * | 2/2018 | |
| CN | 108142087 A | * | 6/2018 | ............ A01D 31/00 |
| CN | 207491552 U | | 6/2018 | |
| CN | 108372034 A | | 8/2018 | |
| CN | 209089433 U | | 7/2019 | |
| JP | 2004166635 A | | 6/2004 | |
| KR | 20150046501 A | | 4/2015 | |

* cited by examiner

FULL-HYDRAULIC CHAIN REVERSING AND REMOTE CONTROL WATER-POWER HARVESTING EQUIPMENT FOR LOTUS ROOTS

CROSS REFERENCE TO RELATED APPLICATION

This patent application is the national phase application of International Application No. PCT/CN2020/119904 filed on Oct. 9, 2020, the entire content of which is incorporated by reference herein in its entirety for all purposes.

TECHNICAL FIELD

The present disclosure relates to the technical field of agricultural machinery, and particularly relates to full-hydraulic chain reversing and remote control water-power harvesting equipment for lotus roots.

BACKGROUND ART

At present, the level of mechanization of lotus root harvesting operations is extremely low. The operations are mainly based on primitive operation methods and manual excavation, part of the use of water gun nozzles to help harvest lotus roots. The operation environment for harvesting lotus roots is particularly harsh, especially in winter. Lotus-root farmers work in cold ice water, so that the labor intensity is extremely large, and the net mining rate is low, which seriously damages lotus roots, and has the poor product quality. Therefore, spacious lotus-root farmers and main lotus-root producing areas are eager to the emergence of automatic equipment that integrates harvesting and treatment, so as to replace the manual labor and make the lotus-root farmers to free from the heavy manual labor.

Especially, a mechanized method of digging lotus roots is a small jet-type lotus-root digging boat which uses a sewage pump to eject a high-pressure jet to the bottom of a lotus-root pond, so as to flush away silt attached to the lotus roots. Further, the lotus roots rise to the surface with the help of buoyancy to realize the collection of the lotus roots. In recent years, relevant departments in various localities have carried out research on the lotus-root digging machinery, which has gained certain achievements There are mainly several small and medium-sized lotus-root digging boats (machines), and these boats have problems such as low automation degree, low operation efficiency, unstable operation, unsatisfactory effect of digging lotus-root, and low net mining rate, and so on. Most lotus-root digging boat machines are used for digging lotus roots in the lake, which is not suitable for harvesting in shallow water areas for planting lotus-roots. The present disclosure provides fully-hydraulic chain reversing and remote control hydraulic harvesting equipment for lotus roots, which is suitable for harvesting lotus roots in the pond. The equipment is also suitable for harvesting other aquatic rhizomorphous plants.

SUMMARY

The present disclosure aims to provide full-hydraulic chain reversing and remote control water-power harvesting equipment for lotus roots, so as to solve the problems in the existing art. So, the full-hydraulic configuration and the remote control can be realized, upper modules of the whole equipment can be hydraulically lifted up and fall down, so as to adapt to requirements of different operating water depths.

In order to achieve the above objective, the present disclosure provides the following solution. The present disclosure provides full-hydraulic chain reversing and remote control water-power harvesting equipment for lotus roots. The equipment includes a main framework, a traveling module, an elevating module and a working module. The main framework is of a double-cross-beam structure; the working module is a skid-mounted structure; the working module is in transmission connection with the traveling module through the elevating module, and is fixedly mounted on a top surface of the main framework.

The traveling module includes caterpillar bands and a double-hydraulic-motor group; the double-hydraulic-motor group is in transmission connection with the caterpillar bands; the caterpillar bands and the double-hydraulic-motor group are fixedly mounted on a bottom cross beam of the main framework.

The working module comprises a power driving module, a jet working module, a water suction pipeline module and a hydraulic power module; the power driving module is communicated with the hydraulic power module.

The jet working module comprises a chain-reversing swing jet mechanism, a sewage pump, pipelines, a first water separating packet, a second water separating packet and a plurality of nozzles; the sewage pump is in transmission connection with both the power driving module and the hydraulic power module; the sewage pump is further communicated with water suction pipelines of the water suction pipeline module; the sewage pump is communicated with the first water separating packet; the first water separating packet is communicated with the second water separating packet through the pipelines; the first water separating packet is communicated with the pipelines through respective quick-change joints; the chain-reversing swing jet mechanism is communicated with the nozzles through the second water separating packet; adjacent ones of the nozzles are arranged on the second water separating packet at equal intervals in a staggered manner.

The power driving module comprises a combined heat dissipater, a diesel engine, a fuel tank and a transfer case; the fuel tank is arranged on a top side of the diesel engine and communicated with the diesel engine; the combined heat dissipater is arranged on one side of the diesel engine; and the transfer case is in transmission connection with the diesel engine by a coupling.

Preferably, a chassis adopts a integrated design that the hydraulic motor drives rubber caterpillar bands. The caterpillar bands are preferably wide-breadth rubber caterpillar bands each having a width not less than 400 mm, so as to enlarge a contact area with the lotus-root mud, which adapts to an operation requirement for loosening the lotus-root mud in water. The selection standard for the wide-breadth rubber caterpillar band is that the normal ground pressure of the caterpillar band is less than the normal ground pressure of two feet of a normal human body. The caterpillar bands of the traveling module mainly use engineering plastic caterpillar bands to reduce the cost.

The rubber caterpillar bands and the double-hydraulic-motor group form the traveling module and are remotely controlled. The hydraulic motors are integrated with high-torque big-reduction-ratio speed reducers to drive the caterpillar bands, and a shell is fixed on a cross beam. A specific driving solution is as follows. A hydraulic system drives the two hydraulic motors. Specifically, the motors are controlled through two three-position four-way valves and a proportional speed regulating valve to rotate clockwise and anticlockwise, thereby realizing move forward and backward. The proportional velocity regulating valve controls the changes of the forward and backward movement speeds by means of flow adjustment, so as to realize small-diameter turning by the forward and backward movements. A difference in speeds of the two motors is adjusted to realize large-diameter turning. Therefore, this solution is convenient for adjusting and controlling various direction changes and speed changes of the overall equipment, without frequently adjusting the speed of a diesel engine and adding a speed change box, so as to achieve the objectives of simplifying the transmission and facilitating control of the traveling direction and speed of the chassis. The three-position four-way valve and the proportional speed regulating valve may be replaced by a proportional reversing valve.

Preferably, the sewage pump uses a self-priming initiated sewage pump; a pressure of a water outlet is increased by increasing the rotating speed; and a pressure of an output port is not less than 0.5 MPa.

Water discharged by the sewage pump enters the first water separating packet and then enters the second water separating packet via a hose; the hose and the two water separating packets are connected through quick-change joints. The sewage pump is mounted on the whole upper part and is connected with the diesel engine through a transfer case, which is convenient for switching the sewage pump.

Much further, the chain-reversing swing jet mechanism includes a hydraulic motor, a chain, a chain wheel, a power pin shaft, a power chain link, a reversing mechanism, a transverse sliding rail, a framework, and an elevating mechanism. A sliding block in the reversing mechanism is connected with the chain through the power pin shaft and the power chain link on the chain, and moves on the sliding rail in a vertical direction. The reversing mechanism is driven by the chain to move along the transverse sliding rail and is reversed at a semicircle that is formed by two ends of the chain wheel contacting the chain; and the sliding block moves on the sliding rail in the vertical direction, which realizes the reversing. The chain is reversed steadily without the impact, and can realize constant-speed motion under the driving of the hydraulic pump. In this way, the staying time is prolonged at the chain contact semicircle, so as to ensure the jet durations of the nozzles at two ends and enhance the jet effect at the two ends.

The second water separating packet is lifted up and fallen down by means of the elevating mechanism mounted on the reversing framework, so as to adapt to requirements of different operating water depths. An elevating guide rod capable of sliding up and down is mounted in a guide slot of the reversing mechanism framework. The lower end of the elevating guide rod is connected with the second water separating packet, and the upper end thereof is connected with a hydraulic motor base. The hydraulic motor is connected with the reversing mechanism framework through a connection screw rod. The rotation of the hydraulic motor drives the screw rod to rotate. A distance between the hydraulic motor base and the reversing mechanism framework is changed, so as to drive, the second water separating packet to rise up and drop down by means of a connection rod, thereby adapting to requirements of different operating water depths. A rotating angle of the second water separating packet relative to the reversing framework further enhances the jet effect.

One end of a quick-mounting hose is connected to the first water separating packet, and the other end thereof is connected to the second water separating packet. The quick-mounting hose is preferably a fire-fighting water hose quick-change joint. The quick-mounting hose needs to reserve a certain length to ensure that the second water separating packet can swing.

The nozzles are mounted on the second water separating packet, and can realize up-and-down and left-and-right movements by means of the chain-reversing swing jet mechanism. Further, the jet angles of the nozzles can be adjusted by the lower end of the elevating guide rod and the connection bolts on the second water separating packet. The jet working module uses turning taper nozzles each of which circumferentially turns by 15 degrees relative to an axial line thereof, wherein the axial line is a center axial line extended along a length direction of the nozzle; and each nozzle is disposed in a staggered manner on the second water separating packet to enlarge a jet coverage area.

The power driving module includes a combined heat dissipater, a diesel engine, a fuel tank and a transfer case; the fuel tank is arranged on a top side of the diesel engine and is communicated with the diesel engine; the diesel engine is integrated with an electronic speed regulator; stepless speed regulation of the diesel engine can be realized according to an input of the remote controller; the combined heat dissipater is arranged on one side of the diesel engine; and the transfer case is in transmission connection with the diesel engine through a coupling.

The transfer case includes a transfer-case body, a transfer-case input shaft, an oil-pump input shaft (i.e., hydraulic pump input shaft), an oil-pump output port (i.e., hydraulic pump output port), a water-pump input shaft, a water-pump output port, an air guide faucet and a pneumatic tube clutch.

The transfer-case body is mounted on an upper main framework through a connection support; the transfer-case input shaft is in transmission connection with the diesel engine through the coupling; the oil-pump output port is communicated with the diesel engine; the water-pump output port is connected with an inlet of the sewage pump through a flange; the water-pump input shaft is in keyed connection with an output shaft of a hydraulic pump of the hydraulic power module; the pneumatic tube clutch is arranged in the water-pump output port; one end of the air guide faucet is communicated with an outside thereof, and another one end thereof is communicated with the pneumatic tube clutch.

Preferably, the diesel engine and accessories thereof, as well as the transfer case form the power driving module; the diesel engine is connected with the transfer case through a coupling; and the transfer case drives a high-discharge-capacity sewage pump and the hydraulic pump.

An air path system module is further included. The air path system module includes a transmission gear, a pneumatic tube of the pneumatic tube clutch, a baffle plate and a friction body; the transmission gear is in transmission connection with the transfer-case input shaft through a bearing; the pneumatic tube is in transmission connection with the friction body through a compression plate spring arranged in the baffle plate; the friction body is in frication contact with a friction sheet of the water-pump input shaft, and is in transmission connection with the water-pump input shaft through a connection key.

Preferably, the air path system module provides power for integrating the pneumatic tube clutch with the transfer case; the diesel engine is provided with an air pump; after being filtered by two valves for coupling air, the air is input into an air storage tank, and then is coupling to an air guide faucet of the transfer case. An air path air-catching switch of the air guide faucet is connected to control the pneumatic tube clutch of the transfer case to start and stop.

Much further, the transfer case is a self-made triaxial transfer case, which is connected with a shaft where the high-discharge-capacity sewage pump is located and is integrated with the pneumatic tube clutch; the pneumatic tube clutch drives the sewage pump to ensure that the sewage pump starts and stops in the operation process. An electromagnetic clutch or other types of clutches may also be used, whereas their structures are far less simple and reliable than the structure of the self-made integrated pneumatic tube clutch. A specific structure is as follows: the pneumatic tube (air bag), the baffle plate, the spring plate, the friction body, the friction sheet and so on are mounted between the transmission gear and a transmission shaft, so as to form the pneumatic tube clutch; the air guide faucet is ventilated, and the pneumatic tube (air bag) swells; the friction body is in friction contact with the friction sheet connected with the transmission shaft through the baffle plate and the spring plate, so as to drive the transmission shaft to rotate, and thus driving the sewage pump to rotate; bearings are mounted on two sides of the transmission gear; when the air guide faucet is not ventilated, the transmission gear rotates through the bearings, and the transmission shaft does not rotate, thereby realizing dynamic engagement and disengagement of the sewage pump.

The water suction pipeline module further includes water filter pipes, contra-jet devices and pumped water elevating devices; the water suction pipeline includes are of two water suction structures which are at lower part of a pump suction inlet and divided into two paths; and two water suction structures are passed through a lower end of the main framework to reach an other end of the equipment.

Each water suction pipeline is provided with one check valve and two universal joints; the universal joints communicate with a corresponding one of the water filter pipes; a water suction end of each of the water suction pipeline is communicated with a corresponding one of the water filter pipes through a respective one of the pumped water elevating devices.

The pumped water elevating device includes a swing cylinder, a connection flange, an elbow and a flexible connector; two ends of the swing cylinder communicate with the elbow through the flange; and the elbow is connected with a tail of the water filter pipe through the flexible connector.

Much further, the pumped water elevating devices are used to enable vertical rise and fall of the water filter pipes on a working surface of a body of the equipment; and a supporting rod enables each water filter pipe to rise up and drop down in a perpendicular direction on the working surface of the body of the equipment, so as to ensure that the water filter pipes cannot collide with the caterpillar bands in a turning condition of the body of the equipment.

Each contra-jet device is mounted in a corresponding one of the water filter pipes, and includes a connection disk, two high-speed rotating joints and contra-jet pipes.

Two high-speed rotating joints are mounted at the tail of the water filter pipe; each contra-jet pipe is mounted in a corresponding one of the two high-speed rotating joints; jet holes irregularly disposed are formed in each contra-jet pipe; and an included angle is formed between an axial line of each of the jet holes and an axial line of the water filter pipe.

Preferably, the water suction pipeline, the contra-jet device and the pumped water elevating device form the water suction pipeline module to provide a water source for the sewage pump. The water suction pipeline uses two water suction structures which are at a lower part of a pump suction inlet and divided into two paths, and passes through the lower part of the skid-mounted framework to reach the other end of the whole equipment. Each water suction pipeline is provided with one check valve and two universal joints, and the universal joints are connected with the water filter pipe.

The check valve is used to keep water in the sewage pump and the pipeline when the sewage pump is shut down, which is favorable for self-priming initiation of the sewage pump. The two universal joints can adjust the pipeline to bend up and down, and thus ensure that the water filter pipe sinks into the water in the operation process without contacting the mud surface, so as to reduce suction of sludge and other impurities. When the equipment is required to walk on the ground, the equipment can rise up through the pumped water elevating device, and the traveling on the ground is not affected.

The water suction end of the water suction pipeline uses a water filter pipe with an elevating mechanism; the pipe wall of the water filter pipe is preferably provided with a large number of small bulged holes or is perforated; and a filter net is added outside to filter the water source and prevent weeds from entering.

The contra-jet cleaning device is mounted in the water filter pipe; a water source with pressure is introduced from a discharging port of the sewage pump; two high-speed rotating joints are mounted at the tail of a water filter source; a contra-jet pipe is mounted in the two high-speed rotating joints, and is provided with irregularly disposed jet holes; and an angle is formed between the axial line of the jet hole and the axial line of the water filter pipe. Contra-jet achieves cleaning for the holes of the water filter pipe. Meanwhile, due to the presence of biasing angles of the holes in the contra-jet pipe, the water in the sewage pump flows through the pipeline and is introduced into the jet holes to clean the water filter pipe and adsorb impurities. The presence of the included angle causes the contra jet to generate a counter-acting force, the counter-acting force of the jet enables the contra-jet pipe to rotate in the two rotating joints; during rotation, the contra-jet pipe is subjected to water resistance that is in positive correlation with the square of the rotating speed of the contra-jet pipe; and when the counter-acting force of the jet is balanced with the water resistance in the rotation of the contra-jet pipe, the rotating speed tends to be stable. The rotation enhances the jet cleaning effect to achieve an effect of cleaning the holes of the water filter pipe and prevent blockage.

A power water source of the contra-jet cleaning device is from the discharging port of the sewage pump, and the pipeline is provided with a switch.

The pumped water elevating device is mounted at the tail of the water filter pipe. The pumped water elevating device preferably uses a swing cylinder structure; two ends of the swing cylinder are connected with supporting rods; and the supporting rods are connected with the tail of the water filter pipe through flexible connectors. In one hand, when the whole equipment moves forwards, the water filter pipe is guided by the mechanism to move; in other one hand, the water filter pipe is lifted by the mechanism when the sewage pump does not work, and the water filter pipe is lowered by the mechanism when the sewage pump works, which does not contact the ground as much as possible. In addition, the pumped water elevating device lifts and drops the water filter pipe only in a direction perpendicular to the working surface of the equipment body, so as to ensure that the water filter pipe does not collide with the rubber caterpillar bands when the whole equipment turns.

A remote control module is further provided. The remote control module is used to control speed of the diesel engine, a speed regulating valve, a proportional pump and on-off quantity of a plurality of hydraulic execution valves to realize remote control of the equipment.

The hydraulic power module further includes a hydraulic oil tank, a hydraulic executing component and a hydraulic pipeline.

Preferably, the hydraulic system module is powered by the hydraulic pump mounted on the transfer case. A dual-equivalent output variable pump is preferred, and proportional control is preferred.

A key design point of the hydraulic system module is that: the hydraulic system module is a dual-equivalent output variable pump; hydraulic motors are driven by two equivalent outputs through switching of a reversing valve in a no-load condition; during operation, one of the two equivalent outputs drives the two-hydraulic-motor group, and an other one of the two equivalent outputs drives a hydraulic motor of the chain-reversing swing jet mechanism.

Under the no-load condition, traveling needs a relatively high speed; the dual-equivalent output variable pump is in full-power output; the two outputs respectively drive the two traveling motors through the speed regulating valve and the reversing valve to realize that the equivalent outputs drive the traveling hydraulic motors.

During operation, since the traveling speed is greatly reduced, one output drives the two traveling hydraulic motors via division, and the other output drives the chain swing reversing mechanism and other hydraulic mechanisms.

The hydraulic pump of the hydraulic system controls the traveling motors to rotate clockwise and anticlockwise through two three-position four-way valves and a proportional speed regulating valve to realize move forward and turn. The present disclosure provides three turning methods: two hydraulic traveling motors, clockwise rotation and anticlockwise rotation, thereby realizing sharp turning; two traveling hydraulic motors, self-locking stopping, and rotation, thereby realizing quick turning; turning in form of a relatively large radius is achieve by adjusting a speed difference between the two traveling hydraulic motors. The proportional speed regulating valve controls the forward movement speed and the backward movement speed by means of flow adjustment. If small-diameter turning can be realized by the backward and forward movements, large-diameter turning can be realized by adjusting the speed difference between the two hydraulic motors. Therefore, this solution is convenient for adjusting and controlling various directions and speed changes of the whole equipment.

The whole equipment is provided with a 24V direct-current storage battery which is charged by the diesel engine. The 24V direct-current storage battery provides power for the hydraulic execution valve and the control system.

The hydraulic system module uses a 24V proportional speed regulating valve, and the reversing valves are all 24V electromagnetic and manual control valves to facilitate remote control. The 24V proportional reversing valve may be selected, and has the same effect.

The remote control is achieved in combination with the hydraulic system.

A PLC, a remote controller, a receiver, etc. form a remote control module; the whole equipment is remotely controlled; the remote controller sends a control signal; the receiver receives the signal and inputs it to the PLC; and the PLC controls execution elements. The remote control can choose to use touch screen. By means of controlling four analog quantities including the electromechanical speed regulation of the diesel engine, the two speed regulating valves and an electro-hydraulic proportional pump, and by controlling a plurality of switching quantities, the remote control of the whole equipment is realized.

The elevating mechanism includes two hydraulic cylinders and two guide cylinders which are staggered and in transmission connection with the caterpillar bands; guide mechanisms are provided on the two hydraulic cylinders; and the guide mechanisms are used to improve the supporting strength and the guide stability.

Another scheme of the elevating mechanism is a worm gear mechanism provided with four worm gears; every two of the four worm gears form a group, and two groups are respectively mounted on two cross beams of the main framework.

The nozzle has a turning taper of 360 degrees, and turns circumferentially relative to the axial line by 15 degrees. The nozzle includes a clamping nut, a conical water spraying port and a nozzle body; and the nozzles are mounted on the second water separating packet through the respective clamping nuts.

The present disclosure discloses the following technical effects. By the full-hydraulic design and remote control, the automation degree is high; the hydraulic motor drives the wide-breadth rubber caterpillar bands to adapt to operations in soft paddy fields, so that forward and contra-jet movements and turning are flexible; the diesel engine drives the sewage pump and the hydraulic pump via the transfer case; the transfer case is integrated with the pneumatic tube clutch to realize dynamic engagement and disengagement of the sewage pump; the nozzles are indirectly connected with the chain reversing mechanism to realize swing jet; the chain is reversed steadily, and the stay time at two ends is prolonged; furthermore, the jet mechanism can be lifted to adjust a distance from the mud surface, thereby effectively enhancing the water-power jet effect; the water suction pipeline avoids the influence of the impurities and is lifted flexibly; the whole equipment can adjust the height of the upper module and the height of the jet mechanism according to an operating water depth, so as to adapt to requirements of different operating water depths.

BRIEF DESCRIPTION OF THE DRAWINGS

In order to describe the embodiments of the present disclosure or technical solutions in the existing art more clearly, drawings required to be used in the embodiments will be briefly introduced below. Apparently, the drawings in the descriptions below are only some embodiments of the present disclosure. Those ordinarily skilled in the art also can acquire other drawings according to these drawings without creative work.

Figure 1:
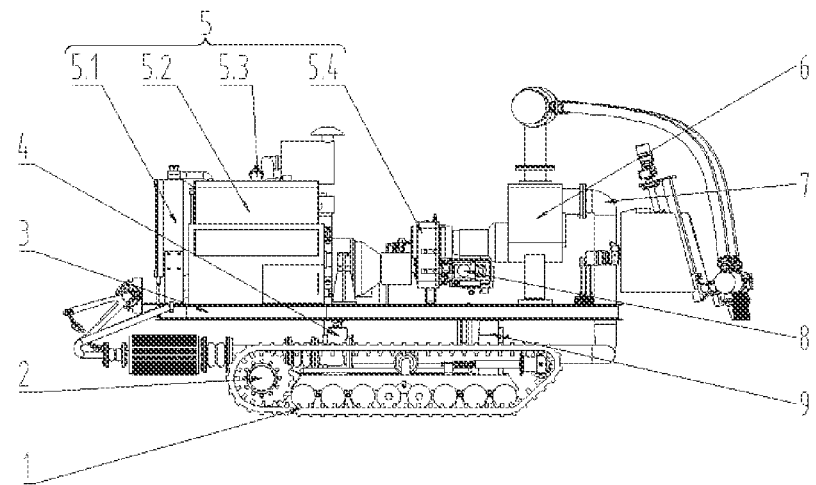
FIG. 1 is a side view of a general structure according to an embodiment of the present disclosure.
Figure 2:
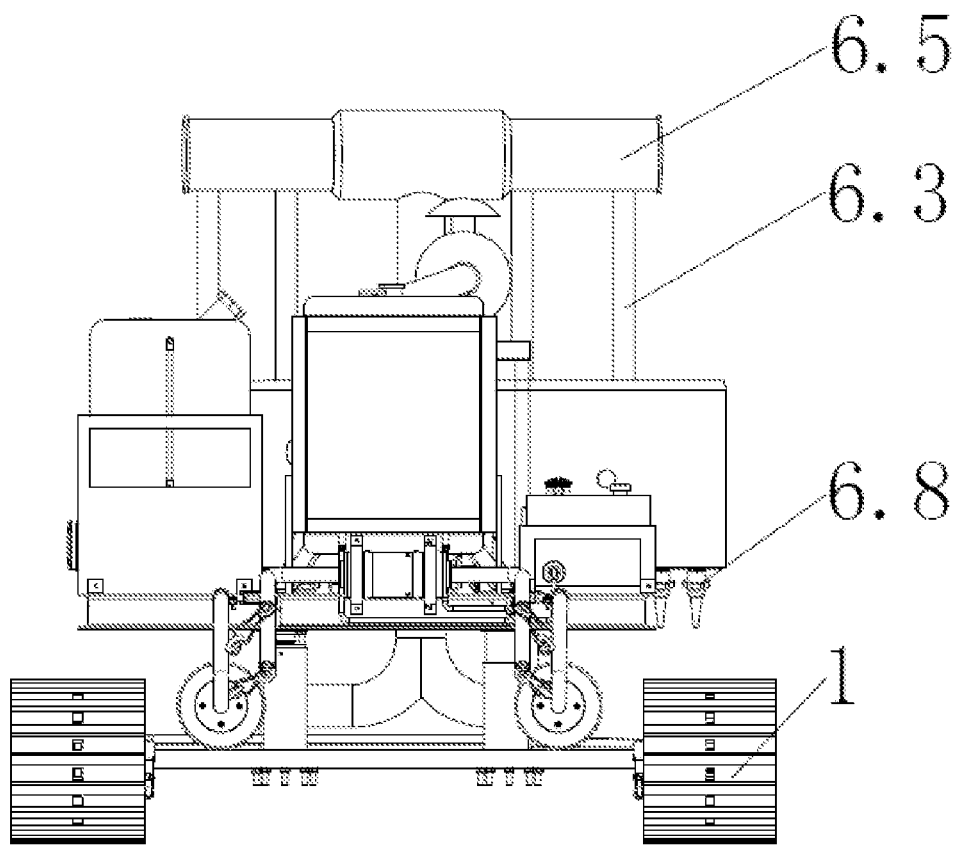
FIG. 2 is a front view of a general structure according to an embodiment of the present disclosure.
Figure 3:
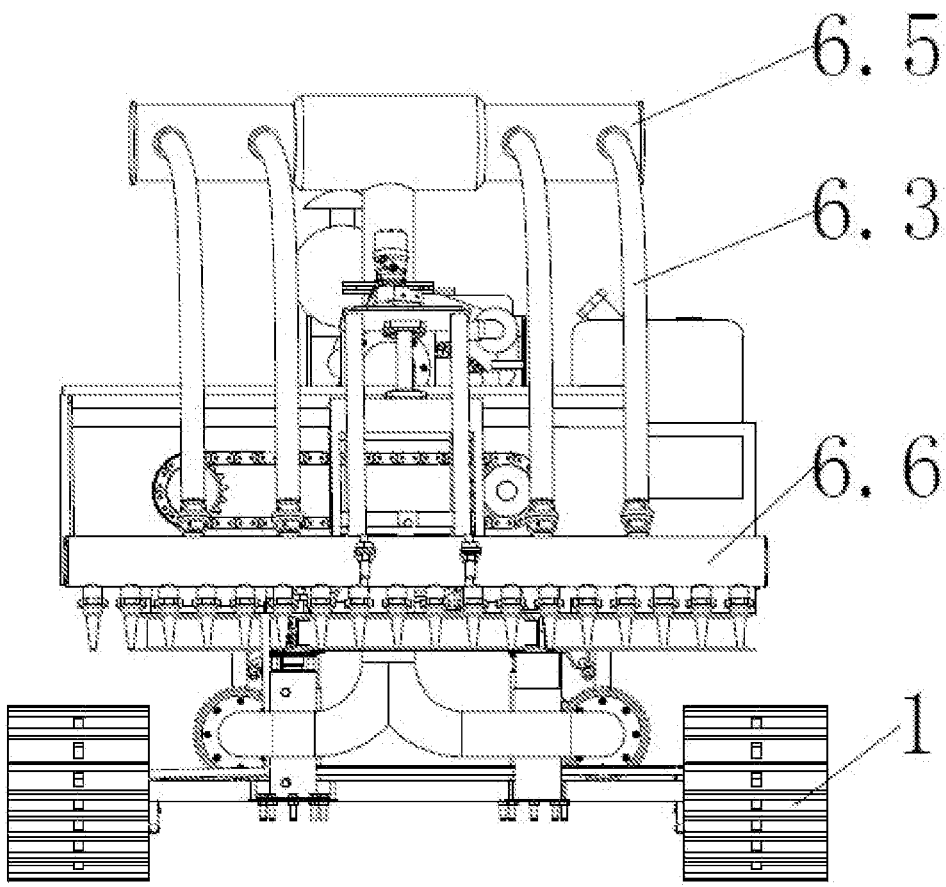
FIG. 3 is a rear view of a general structure according to an embodiment of the present disclosure.

Reference signs in drawings, 1: caterpillar band; 2: two-hydraulic-motor group; 3: main framework; 4: elevating hydraulic cylinder; 5: power driving module; 5.1: combined heat dissipater; 5.2: diesel engine; 5.3: fuel tank; 5.4: transfer case; 6: jet working module; 7: water suction pipeline module; 8: hydraulic power module; 9: guide cylinder; 5.4.1: transfer-case body; 5.4.2: connection support; 5.4.3: transfer-case input shaft; 5.4.4: oil-pump input shaft. 5.4.5: oil-pump output port; 5.4.6: water-pump input shaft; 5.4.7: water-pump output port; 5.4.8: air guide faucet; 5.4.9: pneumatic tube clutch; 5.4.10: transmission gear; 5.4.11: pneumatic tube; 5.4.12: baffle plate; 5.4.13: plate spring; 5.4.14: friction key; 5.4.15: friction sheet. 5.4.16: connection key; 6.1: chain-reversing swing jet mechanism; 6.2: sewage pump; 6.3: pipeline; 6.4: quick-change joint; 6.5: first water separating packet; 6.6: second water separating packet; 6.7: transverse sliding rail; 6.8: nozzle; 7.1: water suction pipeline; 7.1.1: input flange; 7.1.2: Y-shaped pipeline; 7.1.3: check valve; 7.1.4: flexible synthesized rubber joint; 7.2: water filter pipe. 7.3: contra-jet device; 7.3.1: high-speed rotating joint; 7.3.2: contra-jet pipe; 7.3.3: jet hole; 7.4: pumped water elevating device; 7.4.1: swing cylinder; 7.4.2: connection flange; 7.4.3: elbow; 7.4.4: flexible connector; 8.1: hydraulic pump; 8.2: hydraulic executing component; 8.3: hydraulic pipeline; 8.4: hydraulic oil tank.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

In order to make the above-mentioned purposes, characteristics and advantages of the present disclosure more obvious and understandable, the present disclosure is further described in detail below with reference to the accompanying drawings and specific implementation modes.

Referring to FIG. 1 to FIG. 14, the present disclosure provides full-hydraulic chain reversing and remote control water-power harvesting equipment for lotus roots. The full-hydraulic design and the remote control are used; an upper module of the whole equipment can be hydraulically lifted to adapt to requirements of different operating water depths. The whole equipment includes a traveling module, an overall elevating module, a power driving module 5, a jet working module 6, a water suction pipeline module 7, a hydraulic power module 8, a remote control module, and an air path system module. The traveling module mainly includes rubber caterpillar bands 1 and a two-hydraulic-motor group 2; the overall elevating module includes an elevating hydraulic cylinder 4 and a guide cylinder 9; the power driving module 5 includes a combined heat dissipater 5.1, a diesel engine 5.2, a fuel tank 5.3, and a transfer case 5.4; the jet working module 6 includes a chain-reversing swing jet mechanism 6.1, a sewage pump 6.2, a pipeline 6.3, a quick-change joint 6.4, a first water separating packet 6.5, a second water separating packet 6.6, a transverse sliding rail 6.7, and nozzles 6.8; the water suction pipeline module 7 includes a water suction pipeline 7.1, a water filter pipe 7.2, a contra-jet device 7.3, and a pumped water elevating device 7.4; the hydraulic power module 8 includes a hydraulic pump 8.1, a hydraulic oil tank 8.2, a hydraulic executing component 8.3, and a hydraulic pipeline 8.4; and the remote control module includes a PLC, a remote control mechanism, etc. The traveling module realizes traveling and turning of the whole equipment; the power driving module 5 provides power for the whole equipment; the jet working module 6 realizes hydraulic swing jet; the hydraulic system module 8 realizes hydraulic driving of the whole equipment; the remote control module realizes remote control of the whole equipment; and the air path system module provides power for integrating a pneumatic tube clutch to a transfer case. An upper mechanism of the whole equipment is mounted on a girder of the traveling module through the elevating hydraulic cylinder 4 of the hydraulic elevating device and the guide cylinder 9, so as to realize rise up and fall down of the upper equipment body, thereby adapting to requirements of different operating water depths. The power driving module 5, the jet working module 6, the water suction pipeline module 7, the hydraulic system module 8, the remote control module, and the air path system module are integrated on an upper portion of the integrated main framework 3, and are hydraulically driven and remotely controlled by liquid, air and electricity.

Figure 4:
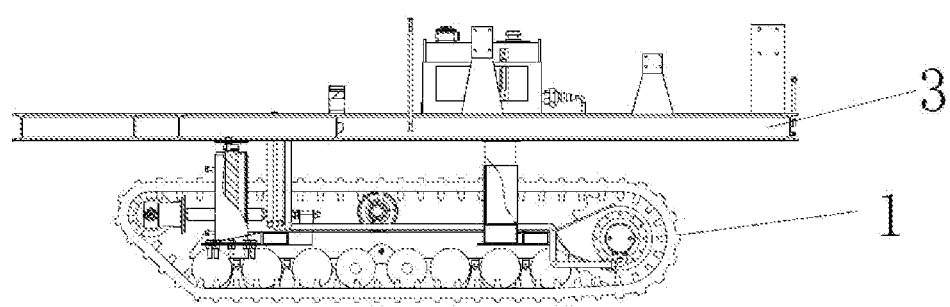
FIG. 4 is a diagram of a elevating mechanism.

Referring to FIG. 4, two hydraulic cylinders 4 and two guide cylinders 9 between a cross beam of the rubber caterpillar band 1 of the traveling module and the upper portion of the framework 3 realize hydraulic rise up and fall down of the whole equipment. The two hydraulic cylinders and the two guide cylinders are staggered; a guide mechanism is provided outside the two hydraulic cylinders in manner of pipe-in-pipe structure, so as to enhance the supporting strength. The upper portion of the framework 3 is sequentially provided with the power driving module 5, the jet working module 6, the water suction pipeline module 7, the hydraulic power module 8, the remote control module and the air path system module.

Referring to FIG. 1, the power driving module 5 is mounted at the front end of the full-hydraulic chain reversing and remote control water-power harvesting equipment for lotus roots, and includes the combined heat dissipater 5.1, the diesel engine 5.2, the fuel tank 5.3, and the transfer case 5.4 sequentially; the combined heat dissipater 5.1 dissipates heat of the diesel engine 5.2; the diesel engine 5.2 is a power source of the whole equipment; the fuel tank 5.3 provides fuel required by operations of the diesel engine 52; and the transfer case 5.4 distributes and transmits power to the whole equipment.

Figure 5:
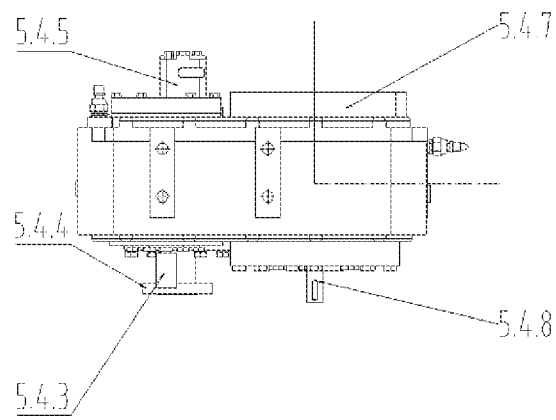
FIG. 5 is a front view of a transfer case.
Figure 6:
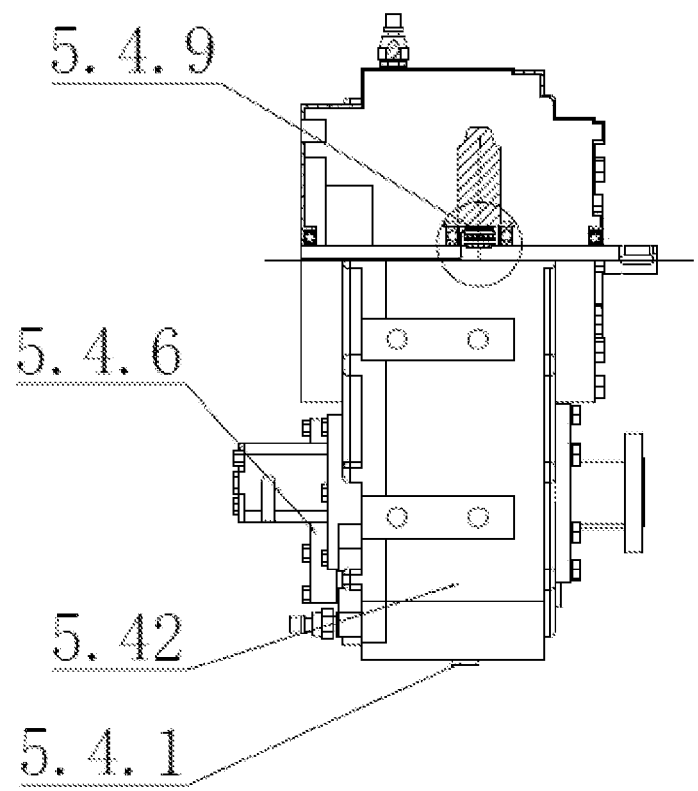
FIG. 6 is a sectional view of the transfer case.
Figure 7:
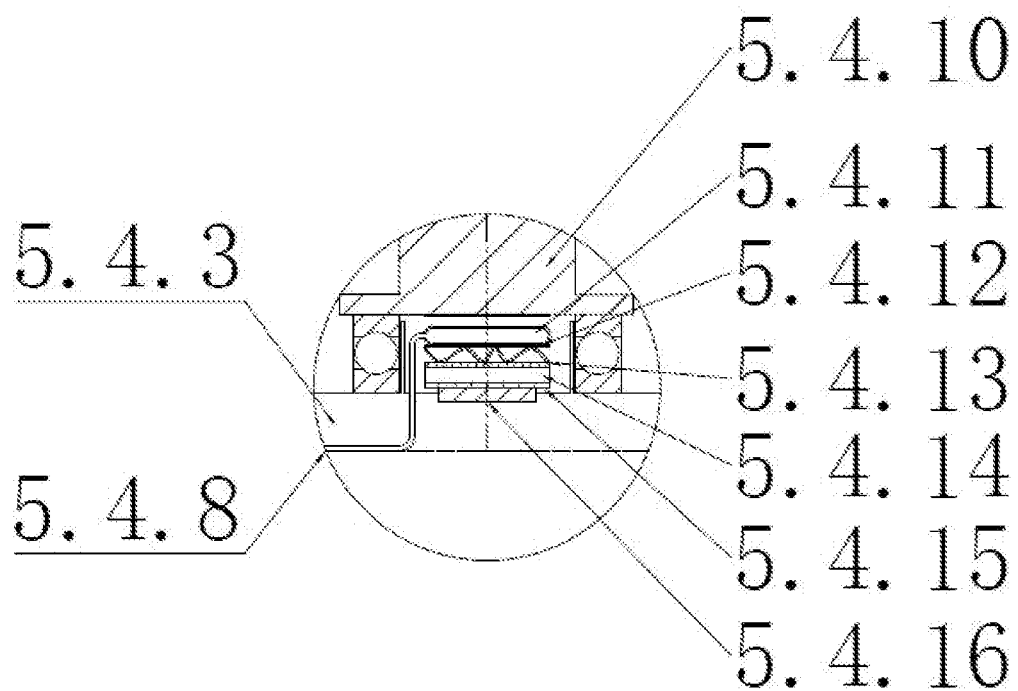
FIG. 7 is a enlarge view of a detail portion A in FIG. 6.
Figure 8:
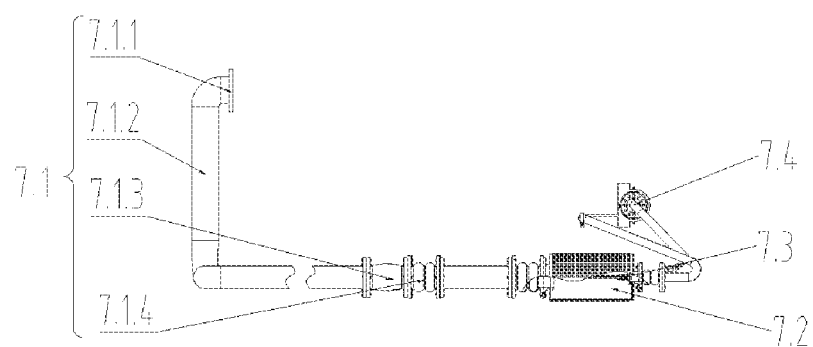
FIG. 8 is a diagram of a water suction pipeline.
Figure 9:
FIG. 9 is a front view of a water filter pipe.
Figure 10:
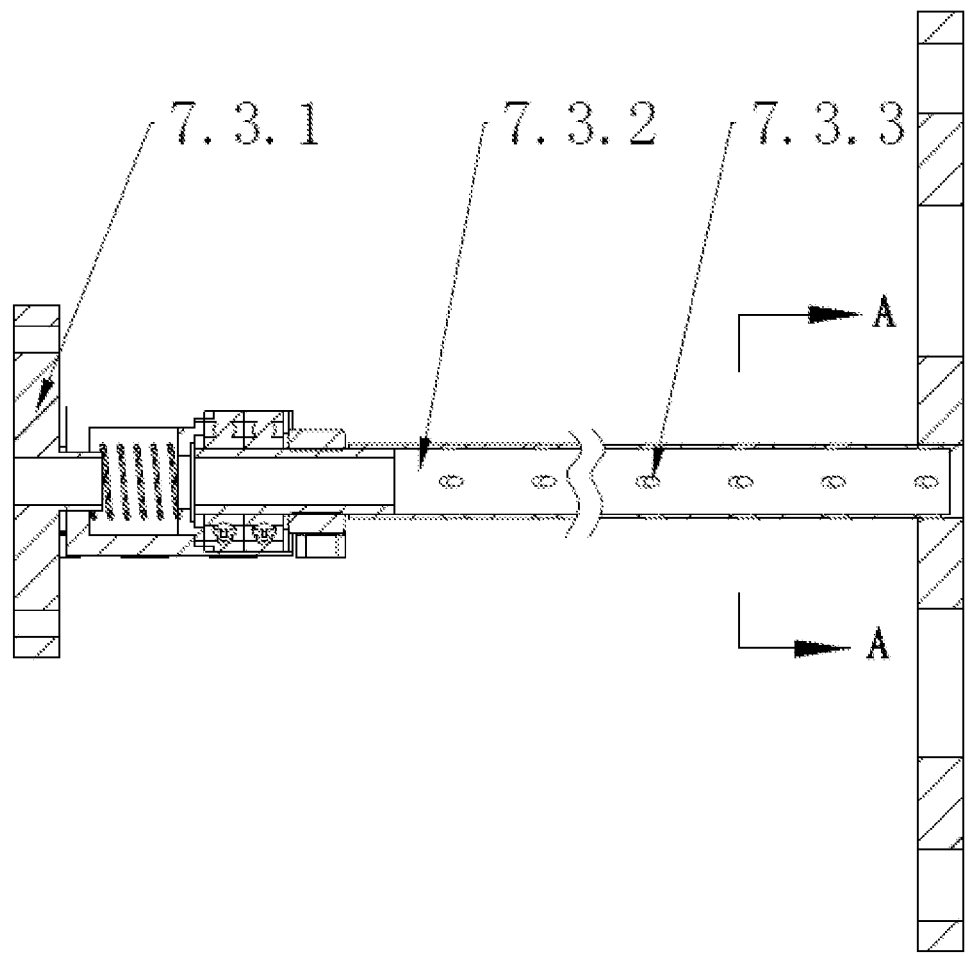
FIG. 10 is a diagram of a contra-jet structure.

Referring to FIG. 5 and FIG. 6, the transfer case 5.4 mainly realizes power transfer transmission and realizes a dynamic engagement and disengagement function; the diesel engine 5.2 is connected with the transfer case 5.4 through a coupling; the transfer case 5.4 drives a high-discharge-capacity sewage pump 6.2 and a hydraulic pump 8.1; the transfer case 5.4 includes a transfer-case body 5.4.1, a connection support 5.4.2, an input shaft 5.4.3, an oil-pump input shaft 5.4.4, an oil-pump output port 5.4.5, a water-pump input shaft 5.4.6, a water-pump output port 5.4.7, an air guide faucet 5.4.8, and a pneumatic tube clutch 5.4.9.

The whole transfer-case body 5.4.1 is mounted on the upper portion of the framework 3 through the connection support 5.4.2; the diesel engine 5.2 is connected with the input shaft 5.4.3 of the transfer case through a coupling; the oil-pump input shaft 5.4.4 is in keyed connection with the hydraulic pump output shaft; the oil-pump output port 5.4.5 is connected with the oil tank; the water-pump input shaft 5.4.6 is in keyed connection with an output shaft of the hydraulic pump 8.1; the water-pump output port 5.4.7 is connected with an inlet of the sewage pump through a flange; the air guide faucet 5.4.8 provides power for the pneumatic tube clutch 5.4.9; and a pneumatic tube pushes a friction sheet in a radial direction to connect the sewage pump input shaft 5.4.6 with the water-pump output port 5.4.7, thereby ensuring that the sewage pump is initiated and shut down in the lotus-root harvesting operation.

The water-pump input shaft 5.4.6 of the transfer case 5.4 can realize dynamic engagement and disengagement. Specifically, the air guide faucet 5.4.8 inputs an air source for controlling; the pneumatic tube 5.4.11 of the pneumatic clutch 5.4.9 swells to compress a plate spring 5.4.13 through a baffle plate 5.4.12; the elastic force of the plate spring 5.4.13 acts on a friction body 5.4.14; the friction body 5.4.14 is in friction contact with a friction sheet 5.4.15 connected with the water-pump input shaft 5.4.6, so as to drive, through a connection key 5.4.16, the water-pump input shaft 5.4.6 to rotate. The air source is cut off; the pneumatic tube 5.4.11 of the pneumatic tube clutch 5.4.9 retracts; under the action of the plate spring 5.4.13, the friction body 5.4.14 does not contact the friction sheet 5.4.15; the transmission gear 5.4.10 rotates through bearings on two sides, and the water-pump input shaft 5.4.6 does not rotate. The transfer case 5.4 can realize dynamic engagement and disengagement.

Referring to FIG. 7 to FIG. 10, the water suction pipeline module 7 includes water suction pipelines 7.1, a water filter pipe 7.2, a contra-jet device 7.3, and a pumped water elevating device 7.4. The water suction pipeline 7.1 includes an input flange 7.1.1, a Y-shaped pipeline 7.1.2, a check valve 7.1.3, and a flexible synthesized rubber joint 7.1.4. The water suction pipelines 7.1 include two water suction structures which are at a lower part of a pump suction inlet and is divided into two paths, and passes through the lower part of the skid-mounted framework to reach the other end of the whole equipment. Each water suction pipeline is provided with one check valve and two universal joints, and the universal joints are connected with the water filter pipe. The water suction end of the water suction pipeline uses the pumped water elevating device 7.4 and the water filter pipe 7.2; the pipe wall of the water filter pipe is preferably provided with a large number of small bulged holes or is perforated, and a filter net is added outside to filter the water source and prevent weeds from entering. A contra-jet cleaning device 7.4 is mounted in the water filter pipe 7.2; a water source with pressure is introduced from a discharging port of the sewage pump 6.2; two high-speed rotating joints 7.3.1 are mounted at the tail of a water filter pipe 7.2; a contra-jet pipe 7.3.2 is mounted in the two high-speed rotating joints 7.3.1, and is provided with irregularly disposed jet holes 7.3.3; and a angle is formed between the axial line of the jet hole 7.3.3 and the axial line of the water filter pipe 7.2. Contra-jet is sprayed to the holes of the water filter pipe 7.2 to achieve cleaning; meanwhile, due to the presence of an offset angle, a counter-reacting force of jet enables the contra-jet pipe to rotate in the two high-speed rotating joints 7.3.1; the rotation enhances the jet cleaning effect to achieve an effect of cleaning the holes of the water filter pipe 7.2, thereby preventing blockage. The pumped water elevating device 7.4 includes a swing cylinder 7.4.1, a connection flange 7.4.2, an elbow 7.4.3 and a flexible connector 7.4.4, two ends of the swing cylinder 7.4.1 are connected with the elbow 7.4.3 through the flange 7.4.2; and the elbow 7.4.3 is connected to the tail of the water filter pipe 7.2 through the flexible connector 7.4.4. In one hand, when the whole equipment moves forwards, the water filter pipe is guided by the mechanism to move; in another one hand, the water filter pipe is lifted up by the mechanism when the sewage pump 6.2 does not work, and the water filter pipe 7.2 is lowered by the mechanism when the sewage pump works, without making the water filter pipe contact the ground as much as possible.

Figure 11:
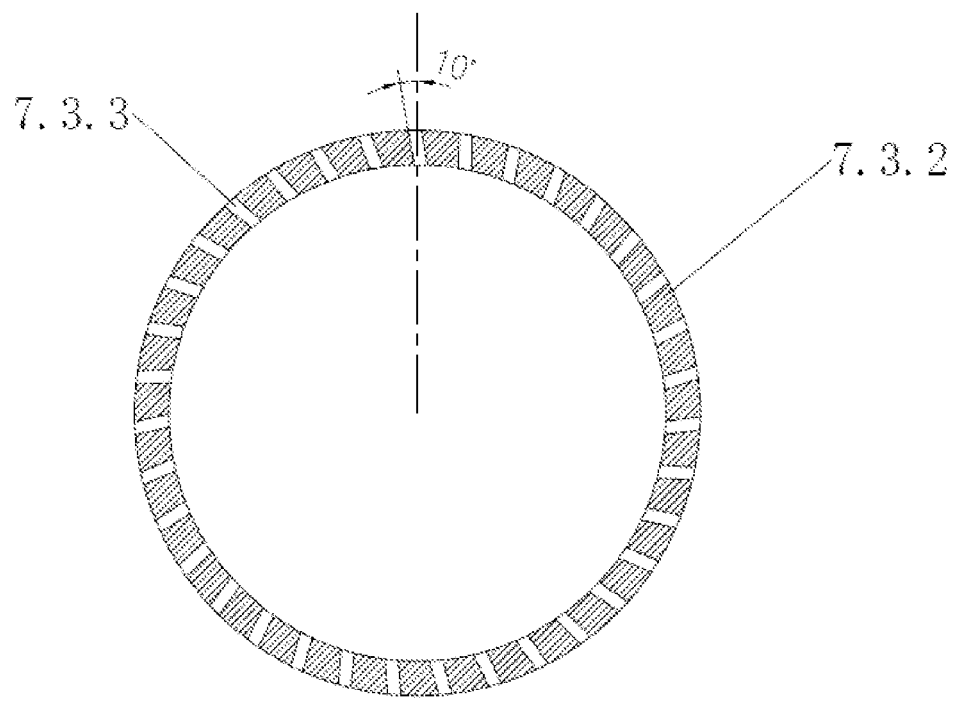
FIG. 11 is a sectional view taken along line A-A in FIG. 9.
Figure 12:
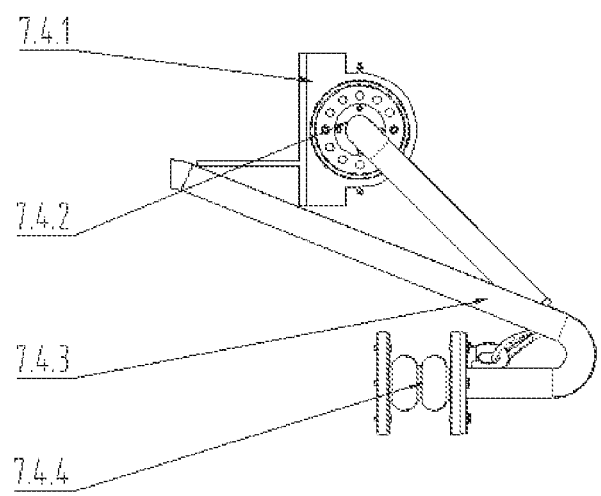
FIG. 12 is a structural diagram of a elevating mechanism of a water filter pipe according to an embodiment of the present disclosure.
Figure 13:
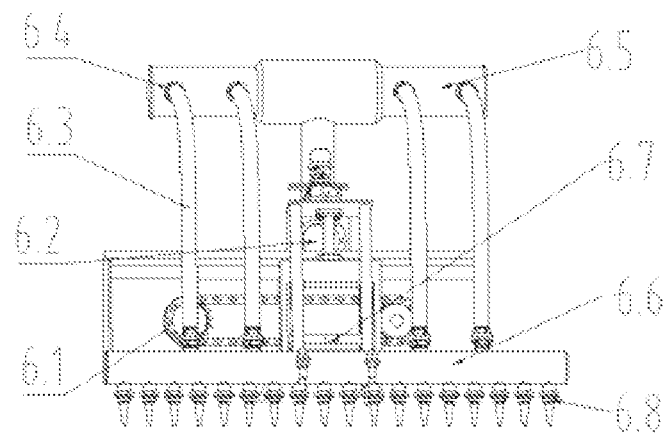
FIG. 13 is a diagram of a chain-reversing swing jet mechanism.
Figure 14:
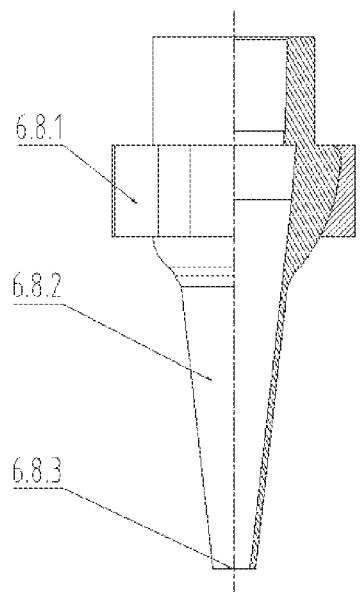
FIG. 14 is a structural diagram of a nozzle.
Figure 15:
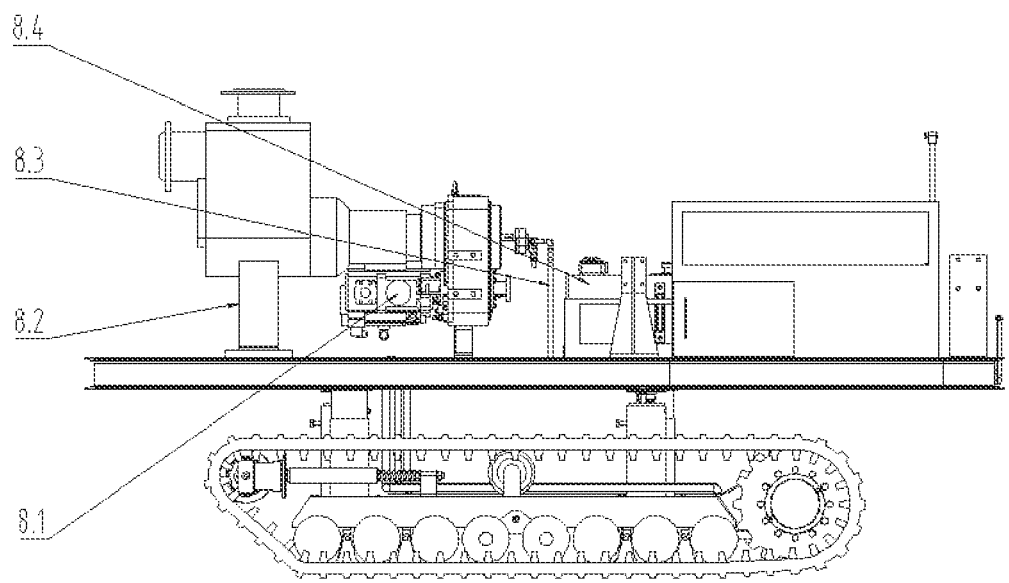
FIG. 15 is a diagram of a hydraulic power module.
Figure 16:
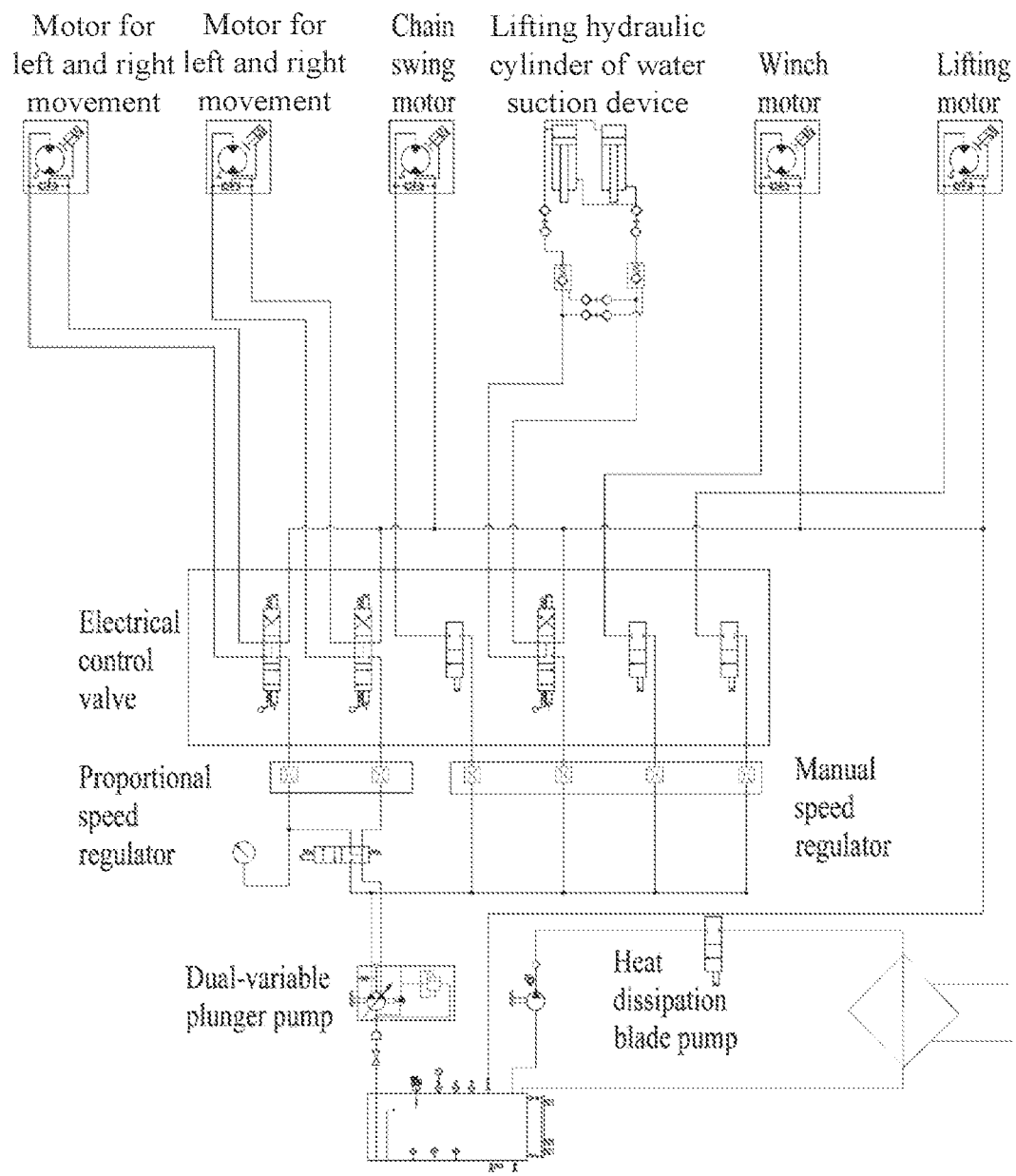
FIG. 16 is a diagram of a hydraulic principle.

Referring to FIG. 11 and FIG. 12, the jet working module 6 includes a chain-reversing swing jet mechanism 6.1, a sewage pump 6.2, a pipeline 6.3, a quick-change joint 6.4, a first water separating packet 6.5, a second water separating packet 6.6, a transverse sliding rail 6.7, and nozzles 6.8. The sewage pump 6.2 provides a power source for the whole jet module; the chain-reversing swing jet mechanism 6.1 can enable the nozzles to move along with the swinging of the chain, so as to enlarge a jet area; the first water separating packet 6.5, the second water separating packet 6.6 and the pipeline 6.3 mainly play a role of conveying sewage with certain pressure to the nozzles 6.8; the chain swing mechanism 6.1, the nozzles 6.8 and so on are mainly connected through the transverse sliding rail 6.7; each of the nozzles 6.8 includes a clamping nut 6.8.1, a conical water spray port 6.8.2, and a nozzle body 6.8.3; and the nozzles 6.8 are connected with the second water separating packet 6.6 through the respective clamping nuts 6.8.1.

A specific working flow of the full-hydraulic chain reversing and remote control water-power harvesting equipment for lotus roots is as follows.

When the full-hydraulic chain reversing and remote control water-power harvesting equipment for lotus roots enters a pond from the land, the traveling motor 2 drives the rubber caterpillar bands 1 to travel; the swing cylinder 7.4.1 in the water suction pipeline elevating mechanism 7.4 drives the elbow 7.4.3 to rotate to guide the water filter pipe to move, so that it is ensured that the water filter pipe 7.2 does not collide with the land and the rubber caterpillar bands 1.

When the full-hydraulic chain reversing and remote control water-power harvesting equipment for lotus roots enters the pond, the water suction pipeline elevating mechanism 7.4 lowers the water filter pipe 7.2, whereas it needs to ensure that the water filter pipe 7.2 does not contact a mud surface. Two hydraulic cylinders 4 and two guide cylinders 9 between a cross beam of the rubber caterpillar band 1 of the traveling module and the upper portion of the framework 3 realize hydraulic rise up and fall down of the whole equipment, so as to realize operations on water surfaces with different heights.

When lotus roots are harvested by the full-hydraulic chain reversing and remote control water-power harvesting equipment for lotus roots, the pneumatic tube clutch 5.4.9 in the transfer case 5.4 is pulled to initiate the sewage pump 6.2, so as to enable the diesel engine 5.2 to start for all the modules on the upper portion of the main framework 3; the hydraulic pump 8.1 drives the sewage pump 6.2 to work; water in the pond is sucked from the water filter pipe 7.2 and reaches an inlet of the sewage pump 6.2 along the water suction pipeline 7.1; the water reaches the first water separating packet 6.5 of the jet working module 6 via an outlet of the sewage pump 6.2, water with certain flow and pressure sucked in the first water separating packet enters the second water separating packet 6.6 via the pipeline 6.3, and is then sprayed from the nozzles 6.8 to push the lotus roots out of sludge.

During lotus root harvesting, the contra-jet cleaning device 7.3 (i.e., contra-jet device) is mounted in the water filter pipe 7.2; a water source with pressure is introduced through a discharging port of the sewage pump 6.2; the contra-jet pipe 7.3.2 on the two high-speed rotating joints 7.3.1, which are mounted at the tail of the water filter pipe 7.2, starts to operate; the counter-acting force of the jet enables the contra-jet pipe to rotate in the two high-speed rotating joints 7.3.1; the rotation enhances the jet cleaning effect to achieve an effect of cleaning the holes of the water filter pipe 7.2 and prevent blockage of the water filter pipe 7.2.

In another embodiment of the present disclosure, the elevating mechanism is a worm gear mechanism provided with four worm gears; every two of the four worm gears form a group and two groups are respectively mounted on two cross beams of the main framework 3.

The present disclosure discloses the following technical effects. By the fully-hydraulic design and remote control, the automation degree is high; the hydraulic motor drives the wide-breadth rubber caterpillar bands to adapt to operations in soft paddy fields, so that forward and backward movements and the turning are flexible; the diesel engine drives the sewage pump and the hydraulic pump via the transfer case; the transfer case is integrated with the pneumatic tube clutch to realize dynamic engagement and disengagement of the sewage pump; the nozzles are indirectly connected with the chain reversing mechanism to realize swing jet; the chain is reversed steadily, and the stay time at two ends is prolonged; furthermore, the jet mechanism can be lifted up to adjust a distance from the mud surface, thereby effectively enhancing the water-power jet effect; the water suction pipeline avoids the influence of the impurities and is elevated flexibly; the whole equipment can adjust the height of the upper module and the height of the jet mechanism according to an operation water depth to adapt to requirements of different operating water depths.

In the description of the present invention, it should be understood that orientations or positional relationships indicated by the terms "longitudinal", "transverse", "upper", "lower", "front", "rear", "left", "right", "vertical", "horizontal", "top", "bottom", "inside", "outside" and the like are orientations or positional relationships as shown in the drawings, and are only for the purpose of facilitating the description of the present invention instead of indicating or implying that devices or elements indicated must have particular orientations, and be constructed and operated in the particular orientations, so that these terms are not construed as limiting the present invention.

The above-mentioned embodiments only describe the preferred modes of the present disclosure, and do not limit the scope of the present disclosure. Various deformations and improvements that are made by those of ordinary skill in the art to the technical solutions of the present disclosure without departing from the design spirit of the present disclosure shall all fall within the protection scope determined by the claims of the present disclosure.

What is claimed is:

1. Full-hydraulic chain reversing and remote control water-power harvesting equipment for lotus roots, the equipment comprising a main framework, a traveling module, a elevating module and a working module; wherein the main framework is of a double-cross-beam structure; the working module is a skid-mounted structure; the working module is in transmission connection with the traveling module through the elevating module, and is fixedly mounted on a top surface of the main framework;

the traveling module comprises caterpillar bands; and a double-hydraulic-motor group; the double-hydraulic-motor group is in transmission connection with the caterpillar bands; the caterpillar bands and the double-hydraulic-motor group are fixedly mounted on a bottom cross beam of the main framework;

the working module comprises a power driving module, a jet working module, a water suction pipeline module and a hydraulic power module; the power driving module is communicated with the hydraulic power module;

the jet working module comprises a chain-reversing swing jet mechanism, a sewage pump, pipelines, a first water separating packet, a second water separating packet; and a plurality of nozzles; the sewage pump is in transmission connection with both the power driving module and the hydraulic power module; the sewage pump; is further communicated with water suction pipelines of the water suction pipeline module; the sewage pump is communicated with the first water separating packet; the first water separating packet is communicated with the second water separating packet through the pipelines; the first water separating packet is communicated with the pipelines through respective quick-change joints; the chain-reversing swing jet mechanism is communicated with the nozzles through the second water separating packet; adjacent ones of the nozzles are arranged on the second water separating packet at equal intervals in a staggered manner;

the power driving module comprises a combined heat dissipater, a diesel engine, a fuel tank and a transfer case; the fuel tank is arranged on a top side of the diesel engine and communicated with the diesel engine; the combined heat dissipater is arranged on one side of the diesel engine; and the transfer case is in transmission connection with the diesel engine by a coupling.

2. The full-hydraulic chain reversing and remote control water-power harvesting equipment for lotus roots according to claim 1, wherein the transfer case comprises a transfer-case body, a transfer-case input shaft, an oil-pump input shaft, an oil-pump output port, a water-pump input shaft, a water-pump output port, an air guide faucet and a pneumatic tube clutch;

the transfer-case body is mounted on the upper main framework through a connection support; the transfer-case input shaft is in transmission connection with the diesel engine; through the coupling; the oil-pump output port is communicated with the diesel engine; the water-pump output port is connected with an inlet of the sewage pump through a flange; the water-pump input shaft is in keyed connection with an output shaft of a hydraulic pump of the hydraulic power module; the pneumatic tube clutch is arranged in the water-pump output port; one end of the air guide faucet; is communicated with an outside thereof, and another one end of the air guide faucet is communicated with the pneumatic tube clutch.

3. The full-hydraulic chain reversing and remote control water-power harvesting equipment for lotus roots according to claim 2, further comprising an air path system module, wherein the air path system module comprises a transmission gear, a pneumatic tube of the pneumatic tube clutch, a baffle plate and a friction body; the transmission gear is in transmission connection with the transfer-case input shaft through a bearing; a pneumatic tube is in transmission connection with the friction body through a compression plate spring arranged in the baffle plate; the friction body is in frication contact with a friction sheet of the water-pump input shaft, and is in transmission connection with the water-pump input shaft through a connection key.

4. The full-hydraulic chain reversing and remote control water-power harvesting equipment for lotus roots according to claim 1, wherein the water suction pipeline module further comprises water filter pipes, contra-jet devices and pumped water elevating devices; the water suction pipelines are of two water suction structures which are at a lower part of a pump suction inlet and divided into two paths; and the two water suction structures are passed through a lower end of the main framework to reach an other end of the equipment;

each of the water suction pipelines is mounted with one check valve and two universal joints; the two universal joints are communicated with a corresponding one of the water filter pipes; a water suction end of each of the water suction pipelines is communicated with a corresponding one of the water filter pipes through a respective one of the pumped water elevating devices;

each of the pumped water elevating devices comprises a swing cylinder, a connection flange, an elbow and a flexible connector; two ends of the swing cylinder are communicated with the elbow; through the connection flange; and the elbow is connected with a tail of a corresponding one of the water filter pipes through the flexible connector.

5. The full-hydraulic chain reversing and remote control water-power harvesting equipment for lotus roots according to claim 4, wherein the pumped water elevating devices are used to enable vertical rise and vertical fall of the water filter pipes on a working surface of a body of the equipment; and each of the water filter pipes is lifted up and dropped down vertically via a supporting rod on the working surface of the body of the equipment, so as to ensure that the water filter pipes are not collided with the caterpillar bands in a turning condition of the body of the equipment.

6. The full-hydraulic chain reversing and remote control water-power harvesting equipment for lotus roots according to claim 4, wherein each of the contra-jet cleaning devices are mounted in a corresponding one of the water filter pipes; and each of the contra-jet cleaning devices comprises two high-speed rotating joints and contra-jet pipes;

the two high-speed rotating joints are mounted at the tail of the water filter pipe; each of the contra-jet pipes is mounted in a corresponding one of the two high-speed rotating joints; jet holes irregularly disposed are formed in each of the contra-jet pipes; and an included angle is formed between an axial line of each of the jet holes and an axial line of the water filter pipe.

7. The full-hydraulic chain reversing and remote control water-power harvesting equipment for lotus roots according to claim 1, wherein the hydraulic system module is a dual-equivalent output variable pump; double hydraulic motors are driven by two equivalent outputs through switching of a reversing valve in a no-load condition; during operation, one of the two equivalent outputs drives the two-hydraulic-motor group, and an other one of the two equivalent outputs drives a hydraulic motor of the chain-reversing swing jet mechanism; and the hydraulic power module further comprises a hydraulic executing component, a hydraulic pipeline and a hydraulic oil tank.

8. The full-hydraulic chain reversing and remote control water-power harvesting equipment for lotus roots according to claim 1, further comprising a remote control module, wherein the remote control module is used to control an electromechanical-speed of the diesel engine, a speed regulating valve, a proportional pump and on-off quantity of a plurality of hydraulic execution valves to remotely control the equipment.

9. The full-hydraulic chain reversing and remote control water-power harvesting equipment for lotus roots according to claim 1, wherein an elevating mechanism comprises two hydraulic cylinders and two guide cylinders which are staggered and in transmission connection with the caterpillar bands, respectively; guide mechanisms are provided on the two hydraulic cylinders, respectively; and the guide mechanisms are used to improve supporting strength and guide stability.

10. The full-hydraulic chain reversing and remote control water-power harvesting equipment for lotus roots according to claim 1, wherein each of the nozzles has a turning taper of 360 degrees, and turns circumferentially relative to an axial line thereof by 15 degrees; each of the nozzles comprises a clamping nut, a conical water spraying port and a nozzle body; and each of the nozzles is mounted on the second water separating packet through the clamping nut.

\* \* \* \* \*